United States Patent
Choi et al.

(10) Patent No.: US 10,263,781 B2
(45) Date of Patent: Apr. 16, 2019

(54) IC CHIP AND AUTHENTICATION METHOD FOR USER AUTHENTICATION

(71) Applicant: ICTK Holdings Co., Ltd., Seongnam-si (KR)

(72) Inventors: Byong Deok Choi, Seoul (KR); Dong Kyue Kim, Seoul (KR); Sang Seon Park, Gyeonggi-do (KR); Kwang Hyun Jee, Gyeonggi-do (KR); Dong Hyun Kim, Gyeonggi-do (KR)

(73) Assignee: ICTK Holdings Co., Ltd., Gyeonggi-do (KR)

( * ) Notice: Subject to any disclaimer, the term of this patent is extended or adjusted under 35 U.S.C. 154(b) by 202 days.

(21) Appl. No.: 15/033,554

(22) PCT Filed: Jan. 15, 2014

(86) PCT No.: PCT/KR2014/000427
§ 371 (c)(1),
(2) Date: Apr. 29, 2016

(87) PCT Pub. No.: WO2015/064845
PCT Pub. Date: May 7, 2015

(65) Prior Publication Data
US 2016/0285634 A1   Sep. 29, 2016

(30) Foreign Application Priority Data
Oct. 29, 2013   (KR) .................. 10-2013-0129262

(51) Int. Cl.
*H04L 29/06*   (2006.01)
*H04L 9/32*   (2006.01)
*G09C 1/00*   (2006.01)

(52) U.S. Cl.
CPC .............. *H04L 9/3226* (2013.01); *G09C 1/00* (2013.01); *H04L 9/3234* (2013.01); *H04L 9/3278* (2013.01)

(58) Field of Classification Search
CPC ........ H04L 9/3226; H04L 9/3234; G09C 1/00
(Continued)

(56) References Cited

U.S. PATENT DOCUMENTS

| | | | |
|---|---|---|---|
| 8,352,739 B2* | 1/2013 | Park ..................... | H04L 9/0844 380/247 |
| 2010/0103995 A1* | 4/2010 | Seo ....................... | H04L 5/1438 375/222 |
| 2015/0046340 A1* | 2/2015 | Dimmick ............... | G06Q 20/40 705/72 |

FOREIGN PATENT DOCUMENTS

| KR | 101080511 B1 | 11/2011 |
|---|---|---|
| KR | 1020120045245 A | 5/2012 |

OTHER PUBLICATIONS

Lee, J. et al, "Offline User Authentication Method of Smart Card using PUF," IEEK Summer Conference 2011, vol. 34, No. 1, Jun. 2011, 4 pages. (See p. 1, English language Abstract, and NPL 2, International Search Report Issued in Application No. PCT/KR2014/000427).

(Continued)

*Primary Examiner* — Anthony D Brown
(74) *Attorney, Agent, or Firm* — McCoy Russell LLP

(57) ABSTRACT

An IC chip for preventing an authentication key from leaking, and an authentication key setting and authentication key verifying method are provided. A part performing connection or disconnection between an external terminal and a smartcard chip may be configured by a separate chip or may be incorporated into the smartcard chip to configure a single chip. When the part is configured by the separate chip, the disconnection between the external terminal and the smart (Continued)

card chip can be performed according to whether an authentication key is verified. When the part is configured by the one chip, the disconnection between the external terminal and the smart card chip can be performed under a control of the smartcard chip according to whether the authentication key is verified.

18 Claims, 9 Drawing Sheets

(58) Field of Classification Search
USPC .......................................................... 713/172
See application file for complete search history.

(56) References Cited

OTHER PUBLICATIONS

ISA Korean Intellectual Property Office, International Search Report Issued in Application No. PCT/KR2014/000427, dated Jul. 11, 2014, WIPO, 4 pages.

* cited by examiner

IC CHIP AND AUTHENTICATION METHOD FOR USER AUTHENTICATION

CROSS REFERENCE TO RELATED APPLICATIONS

The present application is a U.S. National Phase of International Patent Application Serial No. PCT/KR2014/000427, entitled "IC CHIP AND AUTHENTICATION METHOD FOR USE AUTHENTICATION," filed on Jan. 15, 2014, which claims priority to Korean Patent Application No. 10-2013-0129262, entitled "IC CHIP AND AUTHENTICATION METHOD FOR USE AUTHENTICATION," filed on Oct. 29, 2013, the entire contents of each of which are hereby incorporated by reference for all purposes.

TECHNICAL FIELD

One or more example embodiments relate to an integrated circuit (IC) chip and an authentication method that perform user authentication prior to use of a smart card, and more particularly, to an IC chip and an authentication method that perform user authentication using a personal identification number (PIN) or a password and connect an external terminal and a smart card chip when a user is authenticated through the user authentication.

BACKGROUND ART

An integrated circuit (IC) chip having a financial function in, for example, a smart card that has recently been used as a credit card is used as a payment method in lieu of cash due to easiness of management and convenience in use.

Despite such easiness of management and convenience in use, issues associated with the IC chip having the financial function, for example, physical card reproduction and card number hacking, are occasionally reported, and thus performing a more reliable user authentication process is required.

The user authentication process may be performed by verifying a personal identification number (PIN) that is unique information of a user or a password that is set directly by a user, at a point in time when a payment is made. However, when performing the user authentication process by allowing an external terminal to access a smart card chip, the smart card may be exposed to a risk of being hacked.

For example, during the access to the smart card chip by the external terminal, a hacking attack may be made from an external source, and may cancel or hinder the user authentication process. Thus, a third party who is not a real holder of the smart card may steal the smart card without the user authentication process and use the stolen smart card.

As described in the foregoing, in an existing user authentication method, there may be a risk of cancelling or invalidating user authentication by a security accident such as, for example, a hacking attack.

DISCLOSURE

Technical Solutions

According to an aspect of the present disclosure, there is provided an integrated circuit (IC) chip including an authenticator configured to authenticate an authentication key, an authentication key setter configured to set an authentication key when the authenticator is activated, and a state storage configured to store an authentication key setting state in a predetermined first field in an idle field of a smart card chip.

The idle field may be at least a portion of an answer to reset (ATR) data idle field of the smart card chip.

The authentication key may be a personal identification number (PIN) to be extracted from a PIN provider in the IC chip used for user authentication or a password including a key value to be injected from an external source.

The state storage may store a first value in the first field when the authentication key is the PIN, and store a second value in the first field when the authentication key is the password.

When the authentication key is the PIN and a key value received from an external terminal corresponds to the extracted PIN, the authentication key setter may set the extracted PIN as the authentication key.

The PIN provider may include a physically unclonable function (PUF) configured to provide the PIN using a semiconductor manufacturing process variation.

When the authentication key is the password, the authentication key setter may reset the authentication key by an authentication key reset command of the external terminal.

The authenticator may be activated by a command received from the external terminal, and may cancel connection between the external terminal and the smart card chip.

When the key value received from the external terminal corresponds to the authentication key, the authenticator may connect the external terminal and the smart card chip.

The command activating the authenticator may be stored in a predetermined second field in an idle field of a protocol parameter selection (PPS) command received from the external terminal.

When the authenticator is activated, the state storage may store a third value in the first field.

According to another aspect of the present disclosure, there is provided a method of setting an authentication key of an IC chip, the method including activating an authenticator by a PPS command to be received from an external terminal, cancelling, by the authenticator, connection between the external terminal and a smart card chip, setting, as an authentication key, any one of a PIN and a password to be selected by a user for user authentication, and storing an authentication key setting state in a predetermined first field in an ATR data idle field.

The storing may include storing a first value in the first field when the authentication key is the PIN, and storing a second value in the first field when the authentication key is the password.

According to still another aspect of the present disclosure, there is provided an IC chip performing a financial function, the IC chip including an authenticator configured to authenticate an authentication key, an authentication key setter configured to set an authentication key when the authenticator is activated, and a control signal unit configured to transmit, to the authenticator, an authentication key control signal indicating an authentication key setting state.

The control signal unit may transmit, to the authentication key setter, an authenticator control signal indicating whether the authenticator is activated.

The authenticator may transmit, to the control signal unit, an authentication control signal indicating whether a key value received from an external terminal corresponds to the set authentication key.

The authentication key may be a PIN to be extracted from a PIN provider in the IC chip to be used for user authentication or a password including a key value to be injected from an external source.

When the authenticator transmits, to the control signal unit, the authentication control signal indicating that the key value received from the external terminal corresponds to the extracted PIN, the authentication key setter may set the extracted PIN as the authentication key.

The PIN provider may include a PUF configured to provide the PIN using a semiconductor manufacturing process variation.

When the authentication key is the password, the authentication key setter may reset the authentication key by an authentication key reset command of the external terminal.

When the authenticator receives, from the control signal unit, the authentication key control signal indicating a state in which the authentication key is not set, the authenticator may cut connection to the external terminal in response to a command excluding an authentication key setting command from the external terminal.

When the authenticator receives, from the control signal unit, the authentication key control signal indicating a state in which the authentication key is set, the authenticator may cut the connection to the external terminal in response to a command excluding an authentication key verification command from the external terminal.

When the key value received from the external terminal does not correspond to the authentication key, the authenticator may cancel connection between the external terminal and a smart card chip by a control signal of the control signal unit.

The authenticator may be activated by a command to be received from the external terminal.

The command activating the authenticator may be stored in a predetermined second field in an idle field of a PPS command to be received from the external terminal.

According to yet another aspect of the present disclosure, there is provided a method of authenticating an IC chip, the method including transmitting, to an authenticator, an authentication key control signal indicating an authenticating key setting state, transmitting, to a control signal unit, an authentication control signal indicating whether a key value received from an external terminal corresponds to a set authentication key based on the authentication key control signal, and cancelling connection to the external terminal when the key value received from the external terminal does not correspond to the set authentication key based on the authentication control signal.

When the authenticator receives the authentication control signal, the method may further include cutting the connection to the external terminal in response to a command excluding an authentication key verification command from the external terminal.

BEST MODE FOR CARRYING OUT INVENTION

Figure 1:
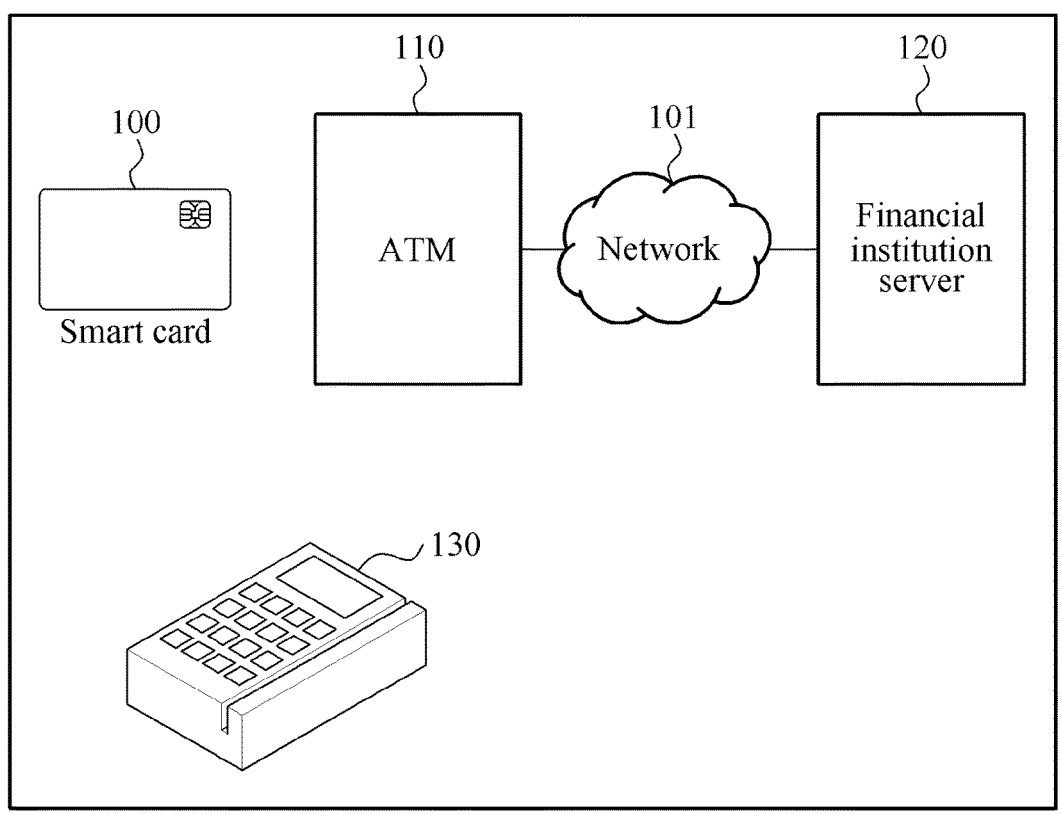
FIG. 1 is a diagram illustrating an integrated circuit (IC) chip for user authentication according to an embodiment.

Hereinafter, some example embodiments will be described in detail with reference to the accompanying drawings. It should be understood, however, that there is no intent to limit this disclosure to the particular example embodiments disclosed. Regarding the reference numerals assigned to the elements in the drawings, it should be noted that the same elements will be designated by the same reference numerals, wherever possible, even though they are shown in different drawings.

FIG. 1 is a diagram illustrating an integrated circuit (IC) chip for user authentication according to an example embodiment.

Referring to FIG. 1, the IC chip according to an embodiment may be included in a smart card 100 that may perform a financial function including, for example, a credit payment. The IC chip may be embodied as an IC chip separate from a smart card chip that actually performs the financial function, or embodied by being merged with the smart card chip.

The IC chip may provide an authentication key, or a certification key, in a form of a time-invariant random number, for example, a personal identification number (PIN) for user authentication. For example, the IC chip may include a physically unclonable function (PUF) configured to provide the PIN through a circuit configuration.

According to an example embodiment, dissimilar to an existing user authentication process performed at a point in time when a payment is made in a financial transaction using an existing type of the smart card 100, user authentication may be performed prior to the financial transaction. In such a case, when the user authentication is not performed, an external access to the smart card chip may not be allowed, and thus a user authentication process may be prevented from being hindered or being cancelled or invalidated by, for example, an external hacking attack.

The PUF, which is one of technologies for preventing reproduction of a digital device using a semiconductor process variation, may be technology for obtaining a unique digital value based on a difference in a process variation between same circuit elements, for example, a difference in a wire delay and in a gate delay. When providing the PIN using such a PUF, the PUF may be merely an arrangement of same semiconductor elements, and thus a leak of the PIN may be prevented in advance because the PIN is not identifiable from the IC chip although another person holds or acquires the smart card 100.

According to an example embodiment, a password may be used as the authentication key. When using the PIN as the authentication key, a unique digital value may be obtained based on the process as described in the foregoing, and thus a user may experience inconvenience in use. Thus, the password that is convenient to use by the user may be used as the authentication key.

When using the password as the authentication key, the password set by the user may be encoded and stored in the IC chip. For example, the password set by the user and input to the IC chip may be stored in a secure zone, or a secure element, in the IC chip after being encoded using the PUF as a key. The password may not be stored in a financial institution server, and thus the password may not be likely to be leaked by hacking the financial institution server. In addition, although another person holds or acquires the smart card 100, the password may not be identifiable from the IC chip, and thus a leak of the password may be prevented in advance.

When the user activates the IC chip in a terminal device such as an automated teller machine (ATM) 110, the PIN may be transferred to the terminal device only when the IC chip is initially activated. The PIN transferred to the terminal device may be output to the user through a display of the terminal device, an additional printout method, and the like. In such a case, the terminal device may not perform any role in providing or storing the PIN, but simply perform a role in forwarding or transferring the provided PIN to the user to allow the IC chip to be in an usable state after being activated.

When the user activates the IC chip in the terminal device such as the ATM 110, the password may be input through the terminal device only when the IC chip is initially activated, and may be injected into the IC chip. The password may be input by the user through an input interface of the terminal device. Here, the terminal device may not perform any role in providing or storing the password, but simply perform a role in forwarding or transferring the provided password to allow the IC chip to be in an usable state after being activated.

The PIN transferred to the user or the password set by the user may be remembered or stored only by the user, and the IC chip may completely cut or isolate a path, physically and/or logically, in order not to provide the PIN or the injected password at a time of any external access after the initial access.

Alternatively, an external access to the PIN or the password may be cut by the terminal device, for example, the ATM 110. The terminal device may cut the external access to the PIN or the password by accessing the IC chip and reading out and outputting the PIN of the IC chip, or by applying a control signal and current to the IC chip when the password input by the user is injected into the IC chip.

The terminal device may then notify the financial institution server 120 of issuance of the smart card 100 including the IC chip through a network 101 to allow the issued smart card 100 to perform a general card function through a member store terminal 130.

In such a case, the financial institution server 120 may not store, in a separate server, the PIN provided by the IC chip or the password injected into the IC chip, and not provide the PIN and the password to a third party that is not the user. Thus, despite a security attack such as a hacking attack made on the financial institution server, exposure of the PIN or the password may be prevented, and thus the financial institution may be exempt from a responsibility for an illegal card use due to the exposure of the PIN or the password.

According to an example embodiment, after being activated, the IC chip may determine whether a PIN or a password input by the user to use the IC chip corresponds to the PIN provided to the IC chip or the password injected into the IC chip for user authentication for use of the smart card 100. In such a case, because the PIN provided to the IC chip or the password injected into the IC chip may be stored after being encoded, a process of determining whether such a key value input by the user through an external terminal corresponds to the PIN or the password may be performed after encoding the input key value.

Figure 2:
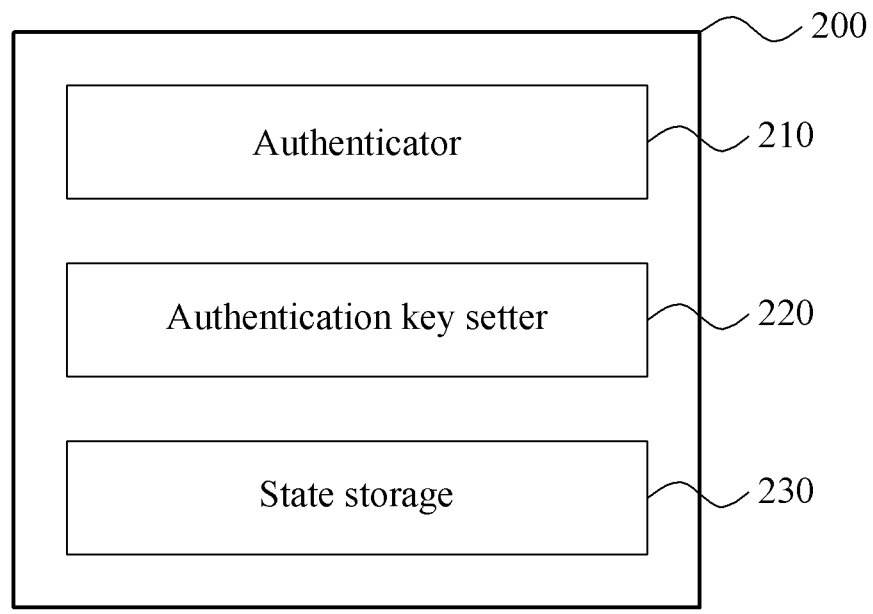
FIG. 2 is a block diagram illustrating a configuration in which an IC chip and a smart card chip are embodied as separate chips according to an embodiment.

FIG. 2 is a block diagram 200 illustrating a configuration in which an IC chip and a smart card chip are embodied as separate chips according to an example embodiment.

The IC chip of the smart card 100 may include an authenticator 210, an authentication key setter 220, and a state storage 230. The IC chip may be a separate chip that connects, to an external terminal, a smart card chip configured to perform a financial transaction in the smart card 100 through a user authentication process, or cancels such a connection.

The authenticator 210 may authenticate an authentication key, and may cancel the connection between the external terminal and the smart card chip based on a result of the authentication. Before the authenticator 210 is activated, the external terminal and the smart card chip may be permanently connected to each other to be used as an existing smart card. However, when the authenticator 210 is activated, the connection between the external terminal and the smart card chip may be cut and the authentication may be performed to re-connect the external terminal and the smart card chip.

According to an example embodiment, when a key value input by a user to the external terminal is transmitted to the IC chip, and the key value received by the IC chip from the external terminal corresponds to a set authentication key, the authenticator 210 that is activated may connect the external terminal and the smart card chip.

Conversely, when the key value received from the external terminal does not correspond to the set authentication key and the authentication fails, the authenticator 210 may not connect the external terminal and the smart card chip to prevent the external terminal from accessing the smart card chip. In addition, when the authentication fails a preset number of times or more, the authenticator 210 may permanently cancel the connection between the external terminal and the smart card chip to disallow the use of the smart card 100. In such a case, a process of resetting an authentication key in a financial institution that issues the smart card 100 may need to be performed, or the smart card 100 may need to be newly issued.

According to an example embodiment, in a case of the authentication key being a PIN extracted from a PIN provider, the smart card 100 may need to be reissued when the connection between the external terminal and the smart card chip is permanently canceled, because a path leading to the PIN provider is completely, and logically and/or physically, cut once the PIN is extracted. Here, when the IC chip includes two or more PIN providers, the smart card 100 may still be usable by resetting the authentication key, instead of reissuing, even when the PIN set as the authentication key is lost.

In the smart card 100, a leak of the authentication key may not occur despite leakage of information by an attack on a financial institution server, for example, hacking, because the financial institution server does not store the authentication key set at a time of user registration.

According to an example embodiment, a command that activates the authenticator 210 may be stored in a predetermined second field in an idle field of a protocol parameter selection (PPS) received from the external terminal. To use a standard specification used in an existing general smart card, a field that is not designated in the standard specification may be designated in advance to store the command activating the authenticator 210. In such a case, the smart card 100 may be usable in an existing smart card system without an additional systemic exchange. A detailed description of setting a PPS command to activate the authenticator 210 will be provided hereinafter.

The authentication key setter 220 may set, as the authentication key for user authentication to be performed before a financial function is performed, the PIN to be extracted from the PIN provider or a password to be injected from an external source.

According to an example embodiment, when using the PIN as the authentication key, the PIN may be extracted from the PIN provider. The PIN provider may provide the PIN, and in more detail, the PIN to be used for the user authentication for use of the smart card 100 using a PUF as described above. However, the PIN provider is not limited to the foregoing, and may be embodied to store a PIN pre-input at a request of one of ordinary skill in the art and provide the PIN to be used for the user authentication for the use of the smart card 100.

For example, the PIN provider may be embodied as a nonvolatile memory such as, for example, an electrically erasable programmable read-only memory (EEPROM). In such an example, the smart card 100 may store a PIN provided as a random number in the EEPROM and provide the stored PIN as an external input PIN to the user, and may authenticate the user by comparing a PIN input from the user to the PIN stored in the EEPROM.

According to another example embodiment, a password set by the user may be used as the authentication key. When using the PIN as the authentication key, the user may experience inconvenience in use because the PIN is provided as a random number as described in the foregoing. Thus, using the PIN as the authentication key may be desirable in terms of security, and using the password as the authentication key may be desirable in terms of convenience in use.

Thus, the password may be used as the authentication key based on a selection by the user. When using the password as the authentication key, there is no need to extract the PIN that is required in a case of using the PIN as the authentication key. Instead, the user may need a process of injecting, into the smart card 100, a password to be used as the authentication key when the smart card 100 is issued. The injected password may be stored in a nonvolatile memory such as, for example, an EEPROM. In such a case, the user authentication may be performed by comparing a password input from the user to the password stored in the EEPROM.

When using the PIN as the authentication key, a verification process to verify whether the user properly verifies the extracted PIN may be required because the PIN is extracted from the PIN provider stored in the IC chip. Thus, when using the PIN as the authentication key, the authentication key setter 220 may perform an additional process of setting the PIN as the authentication key by verifying whether the extracted PIN corresponds to a key value received from the external terminal.

Conversely, when using the password as the authentication key, the additional process of verifying the authentication key may not be required because the password set by the user is injected into the IC chip.

The state storage 230 may store an authentication key setting state in a predetermined first field in an idle field of the IC chip. Similarly to storing the command activating the authenticator 210 in the second field in the idle field of the PPS command to be received from the external terminal, the storing may be performed to use the standard specification used in the existing general smart card, and the authentication key setting state may be stored by designating, in advance, a field that is not designated in the standard specification.

According to an example embodiment, the idle field may be an answer to reset (ATR) data idle field in the IC chip included in the smart card 100. In a general transaction using a smart card, the external terminal may receive ATR data. The ATR data may include a characteristic of the smart card used in the transaction. For example, information about, for example, whether the smart card used in the transaction is an available smart card and an expiration date of the smart card, may be stored in the ATR data, and the ATR data may be transmitted to the external terminal for the transaction using a smart card.

Thus, in storing the authentication key setting state in the idle field of the ATR data, the external terminal may determine whether the authentication key is set when using the smart card 100 and whether the PIN or the password is used as the authentication key when the authentication key is set.

In addition, whether the authenticator 210 is activated may also be stored in the idle field of the ATR data. When the authenticator 210 is not activated, the smart card 100 may be used as an existing general smart card, and thus the external terminal may need to determine whether the authenticator 210 is activated.

In such a case, when the ATR data is received in a transaction using the smart card 100, the external terminal may determine whether the authenticator 210 is activated. In addition, when the authenticator 210 is activated, the external terminal may determine whether the PIN or the password is set as the authentication key and request the user to input the set authentication key.

As described above, an activation state of the authenticator 210 and the authentication key setting state may be stored in the first field in the idle field of the ATR data. However, it is provided as an illustrative example only, and it is obvious to one of ordinary skill in the art that any data field that may be transmitted to the external terminal in a transaction using a smart card may be used.

A description of a separate IC chip that may cancel connection between an external terminal and a smart card chip of the smart card 100 used in a transaction is provided with reference to FIG. 2. Hereinafter, a description of an IC chip provided as a single chip that may cancel connection between an external terminal and a smart card chip will be provided.

Figure 3:
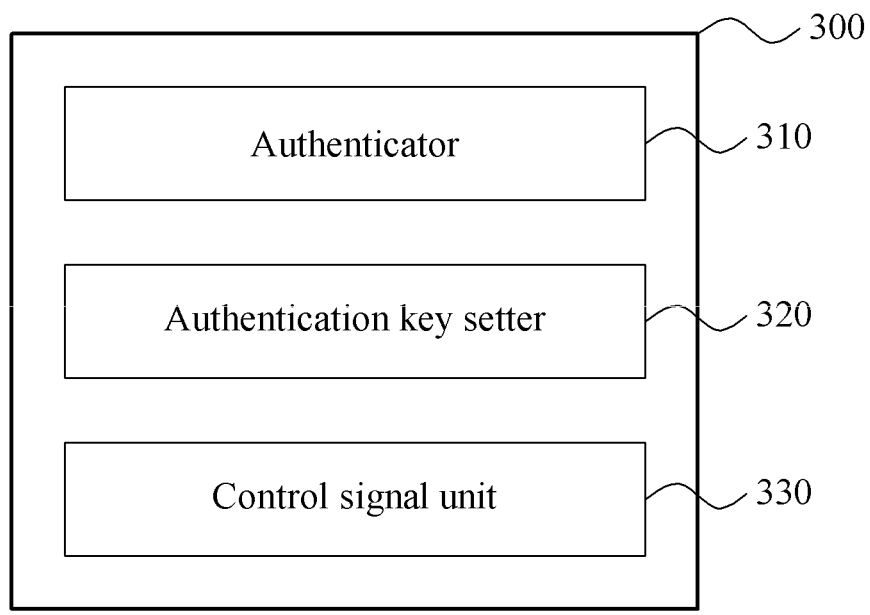
FIG. 3 is a block diagram illustrating a configuration in which an IC chip is merged with a smart card chip to be a single chip in a form of an intellectual property (IP) component according to an embodiment.

FIG. 3 is a block diagram 300 illustrating a configuration in which an IC chip is merged with a smart card chip to be single chip in a form of an intellectual property (IP) component according to an example embodiment.

The IC chip of the smart card 100 includes an authenticator 310, an authentication key setter 320, and a control signal unit 330. With reference to FIG. 3, the IC chip may be embodied as a single chip by being merged with the smart card chip that performs a financial transaction in the smart card 100 to be in an IP component form.

The authenticator 310 may authenticate an authentication key, and may cancel connection between an external terminal and the smart card chip under the control of the smart card chip, or cancel the connection in response to another command that is not a predetermined command. Before the authenticator 310 is activated, the external terminal and the smart card chip may be permanently connected so that the smart card 100 may be used as an existing general smart card.

In addition, after the authenticator 310 is activated, a signal line connection between the external terminal and the smart card chip may be maintained. In FIG. 3, dissimilar to the IC chip described with reference to FIG. 2, the connection between the external terminal and the smart card chip may be fundamentally maintained, and the connection between the external terminal and the smart card chip may be performed or cancelled through a control signal of the smart card chip based on a command to be received from the external terminal.

In FIG. 3, the connection between the external terminal and the smart card chip may be maintained even when the authenticator 310 is activated, and thus the command received from the external terminal may be transferred to the smart card chip without passing through an authentication process. In addition, when authenticating the authentication key, a key value to be received from the external terminal may be transferred to the smart card chip and the smart card chip may transfer, to the authenticator 310, the key value received from the external terminal through the control signal.

As described in the foregoing, the IC chip that connects the external terminal and the smart card chip or cancels the connection between the external terminal and the smart card chip may be embodied as a single chip, and whether to connect the external terminal and the smart card chip or cancel the connection between the external terminal and the smart card chip may be determined based on the control signal of the smart card chip, and thus operations different from the operations described with reference to FIG. 2 may be performed.

Similarly to the operations described with reference to FIG. 2, the authenticator 310 may be activated by a command to be received from the external terminal. However, the command that activates the authenticator 310 may also be transferred as the control signal through the smart card chip.

The command activating the authenticator 310 may be stored in a predetermined second field in an idle field of a PPS command to be received from the external terminal. The storing may be performed to use a standard specification used in an existing general smart card, and the command activating the authenticator 310 may be stored by pre-designating a field that is not designated in the standard specification. In such a case, the smart card 100 may be used in an existing smart card system without an additional systemic exchange.

When the authenticator 310 is activated, the control signal unit 330 may transmit an authenticator control signal indicating whether the authenticator 310 is activated. Whether the authenticator 330 is activated may be determined based on the authenticator control signal, and the authentication key setter 320 may set the authentication key when the authenticator 310 is activated by the authenticator control signal.

When the authenticator 310 is activated, and another command excluding an authentication key setting command is received from the external terminal before the authentication key is set, the connection between the external terminal and the smart card chip may be cancelled. The connection between the external terminal and the smart card chip may be cancelled when a process different from a preset process is performed because the connection between the external terminal and the smart card chip is not cancelled although the authenticator 310 is activated, dissimilar to the operations described with reference to FIG. 2.

The smart card chip may receive, for example, an external hacking attack, because the command received from the external terminal is transferred directly to the smart card chip. The authentication process may be hindered or cancelled by such an attack. Thus, there is a need to prevent an element that may affect an operation of setting the authentication key by another command by blocking another command that is not the authentication key setting command before setting the authentication key.

The authentication key setter 320 may set the authentication key when the authenticator control signal indicating that the authenticator 310 is activated is received. Similar to the operations described with reference to FIG. 2, the authentication key setter 220 may set, as the authentication key for user authentication performed before a financial function is performed, a PIN to be extracted from a PIN provider or a password to be injected from an external source.

According to an example embodiment, when using the PIN as the authentication key, the PIN may be extracted from the PIN provider. The PIN provider may provide the PIN, and in more detail, the PIN to be used for the user authentication for the use of the smart card 100 using a PUF as described above. However, the PIN provider is not limited to the foregoing, and may be embodied to store a PIN pre-input at a request of one of ordinary skill in the art and provide the stored PIN as the PIN for the user authentication for the use of the smart card 100.

For example, the PIN provider may be embodied as a nonvolatile memory such as, for example, an EEPROM. In such an example, the smart card 100 may store a PIN provided as a random number in the EEPROM and provide the stored PIN as an external input PIN to the user, and may authenticate the user by comparing a PIN input from the user to the PIN stored in the EEPROM.

According to another example embodiment, a password set by the user may be used as the authentication key. When using the PIN as the authentication key, the user may experience inconvenience in use because the PIN is provided as a random number as described in the foregoing. Thus, using the PIN as the authentication key may be desirable in terms of security, and using the password as the authentication key may be desirable in terms of convenience in use.

Thus, the password may be used as the authentication key based on a selection by the user. When using the password as the authentication key, a process of extracting the PIN that is required in a case of using the PIN as the authentication key may not be required. The user may need a process of injecting, into the smart card 100, a password to be used as the authentication key when the smart card 100 is issued. The injected password may be stored in a nonvolatile memory such as, for example, an EEPROM. In such a case, the user authentication may be performed by comparing a password input from the user to the password stored in the EEPROM.

When using the PIN as the authentication key, a verification process to verify whether the user properly verifies the extracted PIN may be required because the PIN is extracted from the PIN provider stored in the IC chip. Thus, when using the PIN as the authentication key, the authentication key setter 220 may perform an additional process of verifying whether the extracted PIN corresponds to a key value received from the external terminal and setting the PIN as the authentication key.

When the key value received from the external terminal corresponds to the extracted PIN as a result of verifying the authentication key, the authenticator 310 may transmit, to the control signal unit, an authentication control signal indicating whether the key value received from the external terminal corresponds to the extracted PIN. Dissimilar to the operations described with reference to FIG. 2, whether the key value corresponds to the extracted PIN may need to be transmitted to the control signal unit 330 to determine whether to connect the external terminal and the smart card chip or cancel the connection because the smart card chip controls the connection or the cancellation of the connection based on whether the key value corresponds to the extracted PIN.

Conversely, when using the password as the authentication key, the additional process of verifying the authentication key may not be required because the password set by the user is injected into the IC chip.

When the authentication key is set by the authentication key setter 320, the control signal unit 330 may transmit an authentication key control signal indicating the authentication key setting state. Since the smart card chip controls the connection to the external terminal or the cancellation of the connection, the control signal unit 300 may transmit, to the authenticator 310, the authentication key control signal indicating the authentication key setting state for the control.

The control signal unit 330 may transmit the control signal to control the authenticator 310 and the authentication key setter 320. Dissimilar to the operations described with reference to FIG. 2, the authenticator 310 may autonomously connect the external terminal and the smart card chip or cancel the connection, and the smart card chip may control the connection to the external terminal. Thus, the smart card chip may need an element to control the authenticator 310 and the authentication key setter 320, and the authenticator 310 and the authentication key setter 320 may also need an element to transfer an activation state or a result of authenticating the authentication key to the smart card chip.

To this end, the control signal unit 330 may transmit the authenticator control signal indicating the activation state of the authenticator 310 and the authentication key control signal indicating the authentication key setting state of the authentication key setter 320, and receive the authentication control signal indicating a result of authentication performed by the authenticator 310. In addition, as described in the foregoing, the authenticator 310 and the authentication key setter 320 may transmit, to the smart card chip, the activation state or the result of authenticating the authentication key, and the smart card chip may transmit and receive a transmission and reception control signal, which is an element to transfer the command received from the external terminal and the received key value.

According to an example embodiment, in the operation of verifying the authentication key, the authenticator 310 may need to be activated to allow the authenticator 310 to verify the authentication key, and the authentication key setter 320 may need to set the authentication key. Thus, when the authenticator control signal and the authentication key control signal that indicate the foregoing are transmitted from the control signal unit 330, the verifying of the authentication key may be performed.

When a key value input from the external terminal through the transmission and reception control signal is received, the authenticator 310 may determine whether the input key value corresponds to the set authentication key. A result of determining whether the input key value corresponds to the set authentication key may be transmitted to the control signal unit 330 through the authentication control signal. The smart card chip may control the authenticator 310 that connects the external terminal and the smart card chip or cancels the connection based on the result indicated in the authentication control signal. For example, when the key value received from the external terminal corresponds to the authentication key, the connection may be maintained. Conversely, when the key value does not correspond to the authentication key, the connection between the external terminal and the smart card chip may be cancelled through the authenticator 310.

However, when another command that is not an authentication key verification command is received from the external terminal, the authenticator 310 may cancel the connection between the external terminal and the smart card chip. As described in the foregoing, dissimilar to the operations described with reference to FIG. 2, the connection between the external terminal and the smart card chip may not be cancelled when the authenticator 310 is activated, and thus there is a need to prevent another command that is not the authentication key verification command from being received in such an authentication key verifying operation. Thus, the other command that is not the authentication key verification command may need to be blocked in the authentication key verifying operation because the smart card chip may receive a hacking attack or the authentication key verifying operation may be hindered or cancelled due to the other command that is not the authentication key verification command.

In addition, when the authentication fails a preset number of times or more, the connection between the external terminal and the smart card chip may be permanently cancelled to disallow the use of the smart card 100. In such a case, the authentication key may need to be reset by a financial institution that issues the smart card 100, or the smart card 100 may need to be newly issued to be used again.

Figure 4:
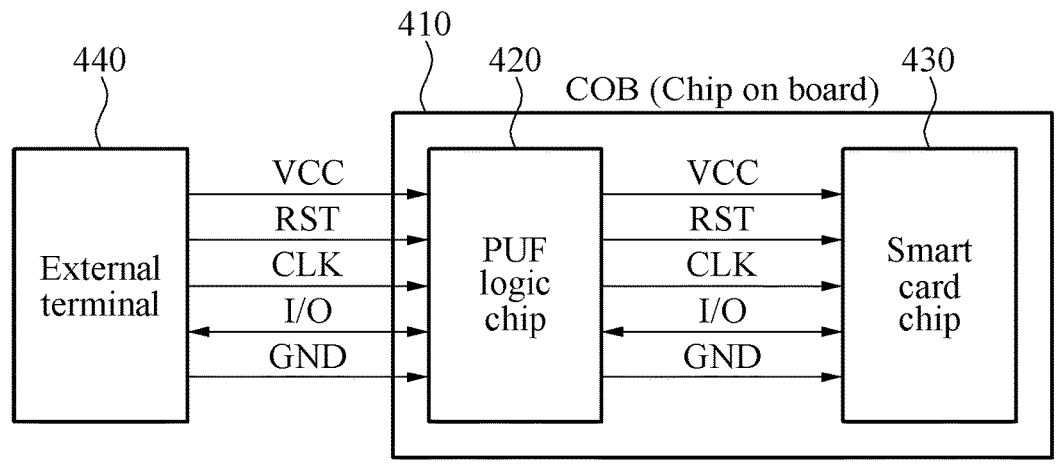
FIG. 4 is a circuit diagram illustrating a configuration in which an IC chip and a smart card chip are embodied as separate chips according to an embodiment.
Figure 5:
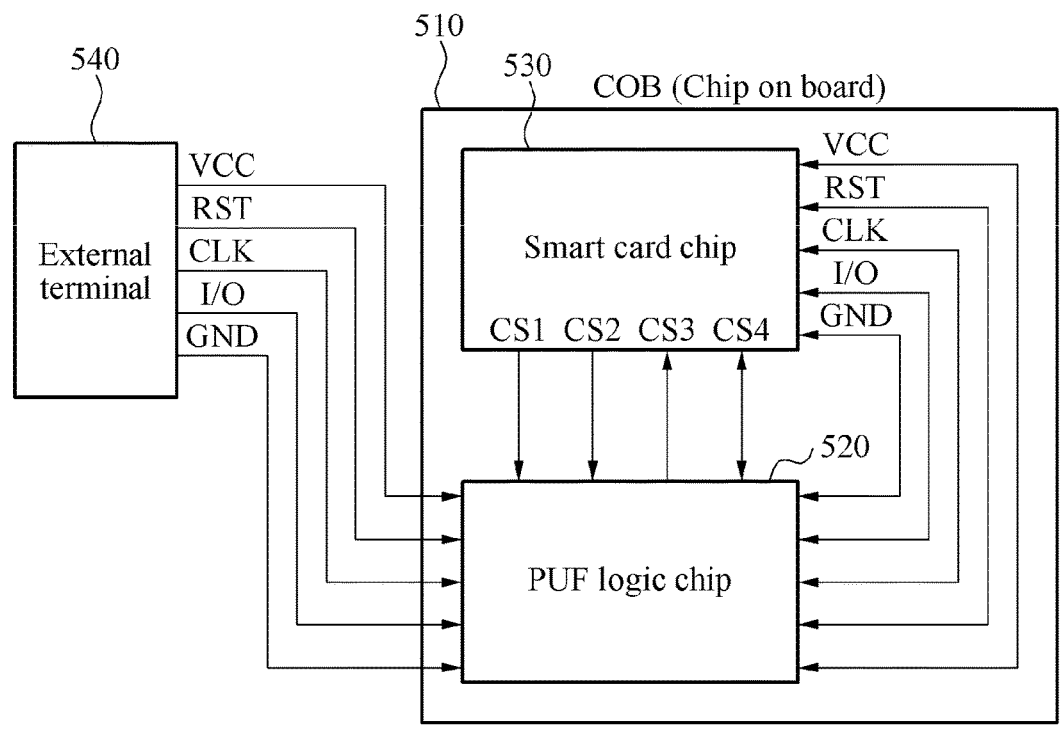
FIG. 5 is a circuit diagram illustrating a configuration in which an IC chip is merged with a smart card chip to be a single chip in a form of an IP component according to an embodiment.

FIGS. 4 and 5 are circuit diagrams illustrating the configurations of an IC chip illustrated in FIGS. 2 and 3.

FIG. 4 is a circuit diagram illustrating a configuration in which an IC chip and a smart card chip are embodied as separate chips according to an example embodiment.

FIG. 4 is a circuit diagram illustrating a portion that connects an external terminal and a smart card chip or cancels the connection, which is configured as a separate IC chip. Referring to FIG. 4, the circuit diagram illustrates an IC chip 420 and a smart card chip 430 disposed on a chip on board (COB) 410. An external terminal 440 and a smart card chip 430 may be connected through the IC chip 420.

As described with reference to FIG. 2, the IC chip 420 may connect the external terminal 440 and the smart card chip 430, or cancel the connection. Thus, the smart card chip 430 may be connected only through the IC chip 420, but not connected directly to the external terminal 440.

According to an example embodiment, the IC chip 420 may be a path that is connected to an external source, and the smart card chip 430 that performs an actual financial function may be connected to the external terminal 440 only through the IC chip 420.

However, the circuit diagram of FIG. 4 is provided as an illustrative example only, and it is obvious to one of ordinary skill in the art that another configuration in which a smart card chip is connected to an external terminal through an IC chip may also be possible.

FIG. 5 is a circuit diagram illustrating a configuration in which an IC chip is merged with a smart card chip to be a single chip in an IP component form according to an example embodiment.

FIG. 5 is a circuit diagram illustrating a configuration of an IC chip merged with a smart card chip 530 to be a single chip in an IP component form 520. Referring to FIG. 4, the smart chip 530 and the IC chip are disposed on a COB 510 to be in the IC component form 520.

Although connection to an external terminal 540 or cancellation of the connection is controlled by the smart card chip 530, the external terminal 540 may need to be connected through a portion in which the IC chip is configured in the IP component form 520 in order to cancel the connection between the smart card chip 530 and the external terminal 540.

Thus, similar to the configuration illustrated in FIG. 4, the portion in which the IP chip is configured in the IP component form 520 may be a path to be connected to an external source, and a smart card chip that performs an actual financial function may be connected only through the portion in which the IP chip is configured in the IP component form 520.

In a case of the IC chip illustrated in FIG. 5, the smart card chip 530 may control the connection to the external terminal and the cancellation of the connection, and thus a control signal may be transmitted and received between the smart card chip 530 and the portion in which the IP chip is configured in the IP component form 520.

The circuit diagram of FIG. 5 is provided as an illustrative example only, and thus it is obvious to one of ordinary skill in the art that another configuration in which a smart card chip is connected to an external terminal through a portion in which an IC chip is configured in an IP component form may also be possible.

A detailed description of activation of an authenticator of an IC chip, setting an authentication key, and an authentication process will be provided hereinafter.

Figure 6:
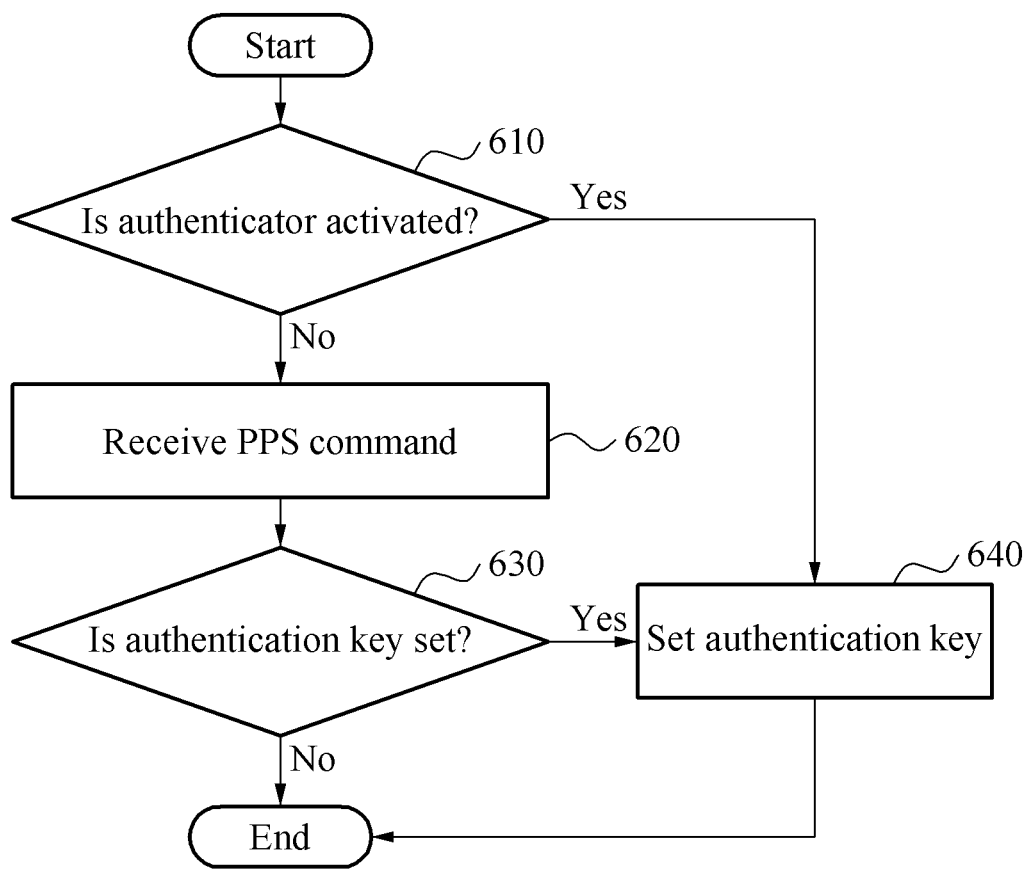
FIG. 6 is a flowchart illustrating a process of activating an authenticator according to an embodiment.

FIG. 6 is a flowchart illustrating a process of activating an authenticator according to an example embodiment.

According to an example embodiment, an authenticator may be activated by a command to be received from an external terminal. The authenticator may authenticate an authentication key, and also connect the external terminal and a smart card chip or cancel such a connection.

In operation 610, whether the authenticator is activated is determined. When the authenticator is activated, an operation 640 of setting the authentication key may be immediately performed. Conversely, when the authenticator is not activated, the command that activates the authenticator may be received from the external terminal.

As described with reference to FIG. 2, whether the authenticator is activated may be stored in a predetermined first field in an ATR data idle field, and may be determined. In addition, as described with reference to FIG. 3, whether the authenticator is activated may be determined through a control signal of the smart card chip.

In operation 620, when the authenticator is not activated, the command is received from the external terminal to activate the authenticator. The command received from the external terminal may be stored in a predetermined second field in an idle field of a PPS command to be received from the external terminal. When there is the command activating the authenticator in the second field of the PPS command received from the external terminal, the IC chip may activate the authenticator.

In operation 630, whether to perform the operation 640 of setting the authentication key is determined. The setting of the authentication key may be performed immediately after the authenticator is activated, or may be performed subsequently. When the setting of the authentication key is performed subsequently, the activating of the authenticator may be terminated.

Figure 7:
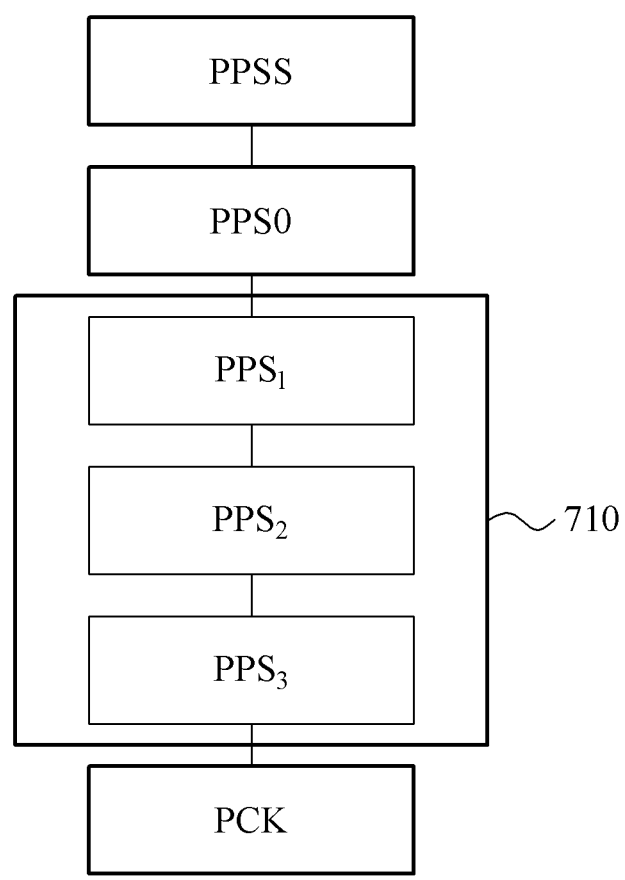
FIG. 7 is a block diagram illustrating a structure of a protocol parameter selection (PPS) command according to an embodiment.

FIG. 7 is a block diagram illustrating a structure of a PPS command according to an example embodiment.

A PPS command, which is a command that activates an authenticator, may have a structure illustrated in FIG. 7. The PPS command may include a PPS command and response (PPSS), and PPS0, PPS1, PPS3, and PCK that are a field 710 in which an authenticator activation command may be stored.

According to an example embodiment, the PPSS may have an FF value, and may indicate initiation of the PPS command. PPS0 may be a format byte indicating presence or absence of PPS1, PPS2, and PPS3, which are the field 710 storing the authenticator activation command. For example, b5=1 of PPS0 may indicate that PPS1 is transmitted, b6=1 of PPS0 may indicate that PPS2 is transmitted, and b7=1 of PPS0 may indicate that PPS3 is transmitted. Thus, the authenticator activation command may be stored in one of PPS1, PPS2, and PPS3 based on PPS0. For example, when PPS3 is an idle field that is not designated in a standard specification, the authenticator activation command may be stored in PPS3. The PCK may be a portion that checks data from the PPSS to one before the PCK, and an exclusive logical sum, for example, an exclusive-or, from the PPSS up to a PCK value may need to be permanently 00.

The structure of the PPS command may be set as described in the foregoing. For example, PPS0, PPS3, and PCK may be set to be 4D, 55, and E7, respectively, and the authenticator activation command may be transmitted to an IC chip.

Figure 8:
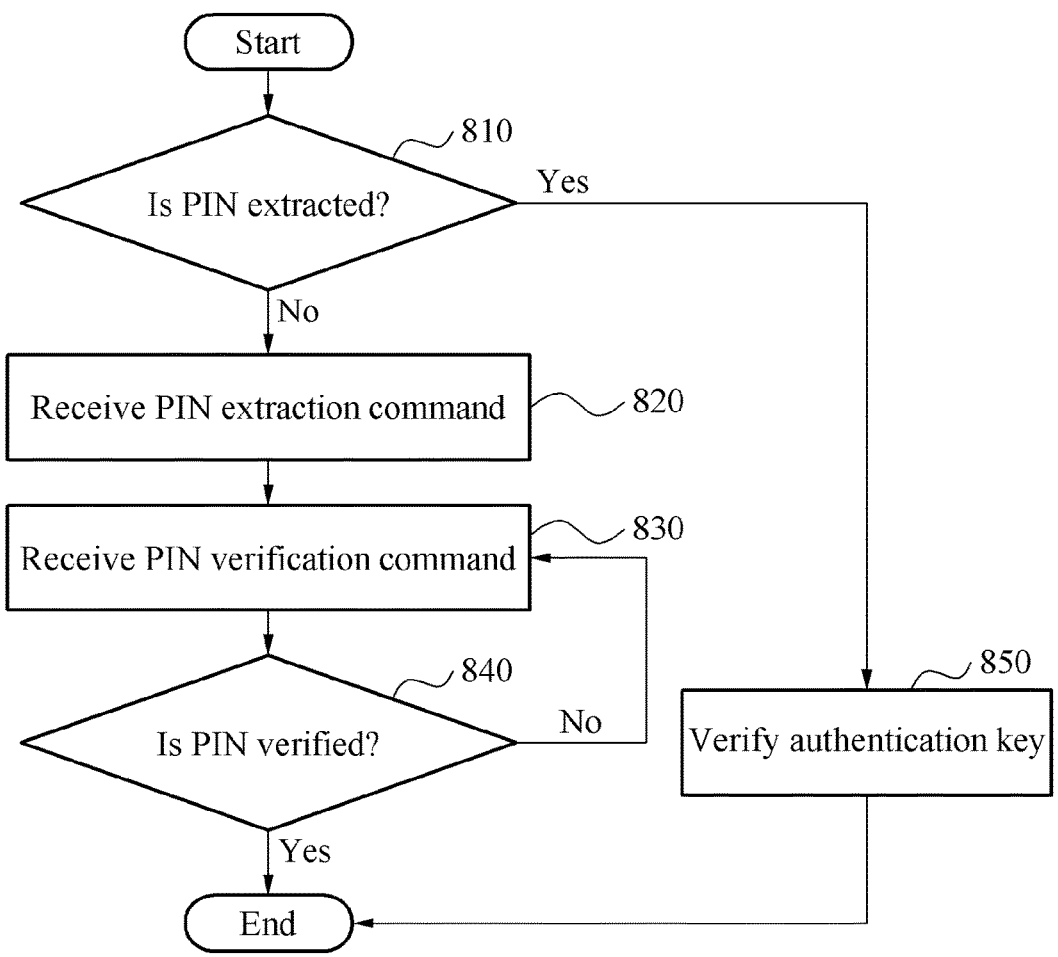
FIG. 8 is a flowchart illustrating a process of extracting a personal identification number (PIN) according to an embodiment.

FIG. 8 is a flowchart illustrating a process of extracting a PIN according to an example embodiment.

FIG. 8 is a flowchart illustrating a process of extracting a PIN when using the PIN as an authentication key. In operation 810, whether the PIN is extracted is determined before extracting the PIN. Whether the PIN is extracted may be determined based on a value stored in a predetermined first field in an ATR data idle field as described with reference to FIG. 2. Since a first value may be stored when the PIN is extracted, it may be determined that the PIN is extracted when the first value is stored in the first field. In addition, whether the authentication key is set may be determined based on a second signal indicating an authentication key setting state as described with reference to FIG. 3.

When the PIN is extracted, operation 850 of verifying the authentication key may be performed. When the PIN is not extracted, a PIN extraction command may be received from an external terminal in operation 820.

In operation 820, the PIN extraction command is received from the external terminal. When the PIN is not extracted, the PIN extraction command may be received from the external terminal to set the authentication key.

When using the PIN as the authentication key, the PIN may be extracted from a PIN provider. The PIN provider may provide the PIN and in more detail, the PIN to be used for user authentication for use of the smart card 100 using a PUF as described above.

In operation 830, a PIN verification command is received from the external terminal. Since the PIN is extracted from the PIN provider stored in an IC chip when using the PIN as the authentication key, a PIN verifying process may need to be performed to verify whether a user properly verifies the extracted PIN.

In operation 840, whether the PIN is verified is determined. When the PIN is not verified, the PIN verifying process may be performed again by receiving the PIN verification command from the external terminal. When the PIN is verified, the verified PIN may be set as the authentication key.

Figure 9:
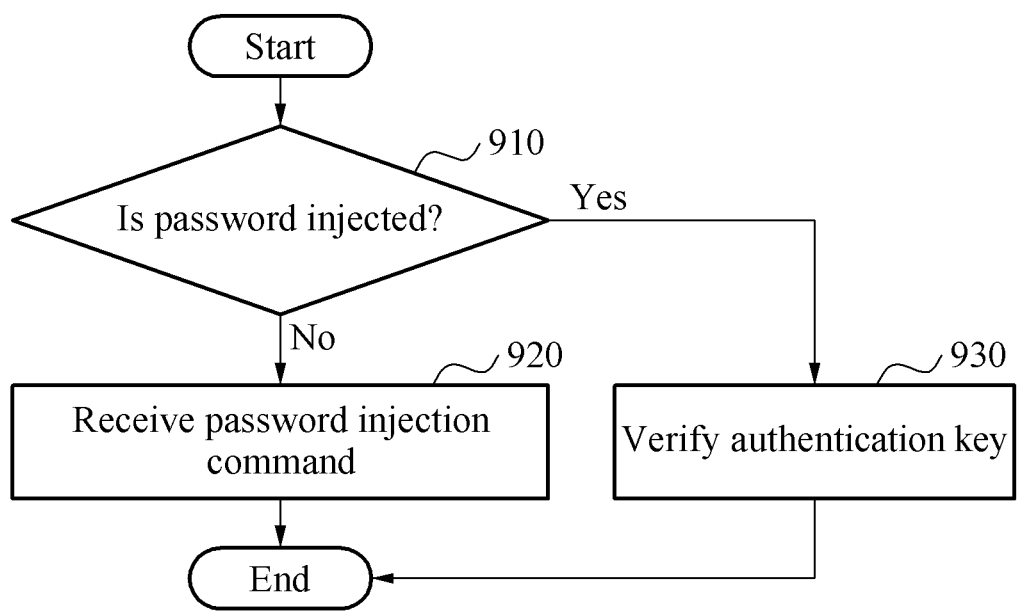
FIG. 9 is a flowchart illustrating a process of injecting a password according to an embodiment.

FIG. 9 is a flowchart illustrating a process of injecting a password according to an example embodiment.

A password set by a user may be used as an authentication key. Since a PIN is provided as a random number when using the PIN as the authentication key as described above, the user may experience inconvenience in use of the PIN. Thus, the password may be used as the authentication key based on a selection of the user.

In operation 910, whether the password is injected is determined before injecting the password into the IC chip. Whether the password is injected may be determined based on a value stored in a predetermined first field in an ATR data idle field as described with reference to FIG. 2. Since a second value may be stored when the password is injected, it may be determined that the PIN is extracted when the second value is stored in the first field. Whether the authentication key is set may be determined based on a second signal indicating an authentication key setting state as described with reference to FIG. 3.

When the password is injected, operation 930 of verifying the authentication key may be performed. Conversely, when the password is not injected, a password injection command may be received from an external terminal in operation 920.

In operation 920, the password injection command is received from the external terminal. When the password is not injected, the password injection command may be received from the external terminal to set the authentication key. Dissimilar to a case of setting a PIN as the authentication key, the password may be set directly by the user, and thus an additional verification process may not be required. Thus, when the password is injected in response to the password injection command, the injected password may be set as the authentication key.

The injected password may be stored in a nonvolatile memory such as an EEPROM. In such a case, user authentication may be performed by comparing a password input from the user to the password stored in the EEPROM.

Figure 10:
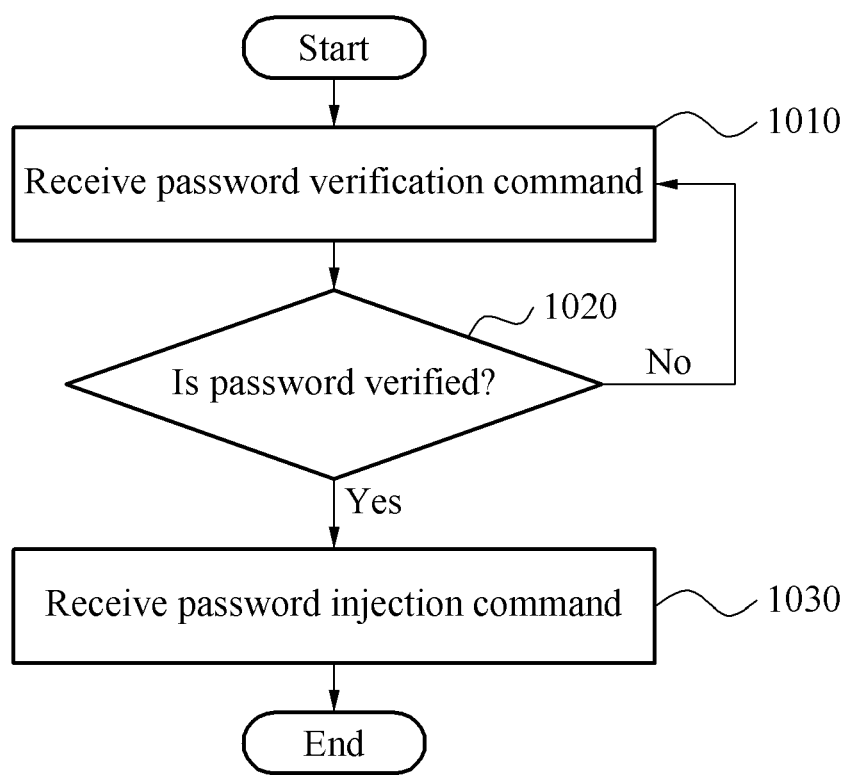
FIG. 10 is a flowchart illustrating a process of changing a password according to an embodiment.

FIG. 10 is a flowchart illustrating a process of changing a password according to an embodiment.

When a password is set as an authentication key, a user may request a change of the password due to a password leak. In a case of using a PIN, connection to a PIN provider may need to be logically and/or physically cut once the PIN is extracted, and thus a smart card may need to be reissued when an IC chip does not further include the PIN provider.

However, when the password is set as the authentication key, the smart card may not need to be reissued because the user re-inject a newly set password into the IC chip.

In operation 1010, a password verification command is received from an external terminal to change the password, because a third party that is not an owner or a possessor of the smart card may make an attempt to change the password.

In operation 1020, when the password verification command is received, a comparison between the password previously set as the authentication key and a key value received from the external terminal is performed. When the password previously set as the authentication key does not correspond to the key value received from the external terminal as a result of the comparison, the password verification command may be received again for re-verification.

In operation 1030, when the password previously set as the authentication key corresponds to the key value received from the external terminal, the authentication key is changed to a password newly set by the user in response to reception of the password injection command from the external terminal to change the password.

Figure 11:
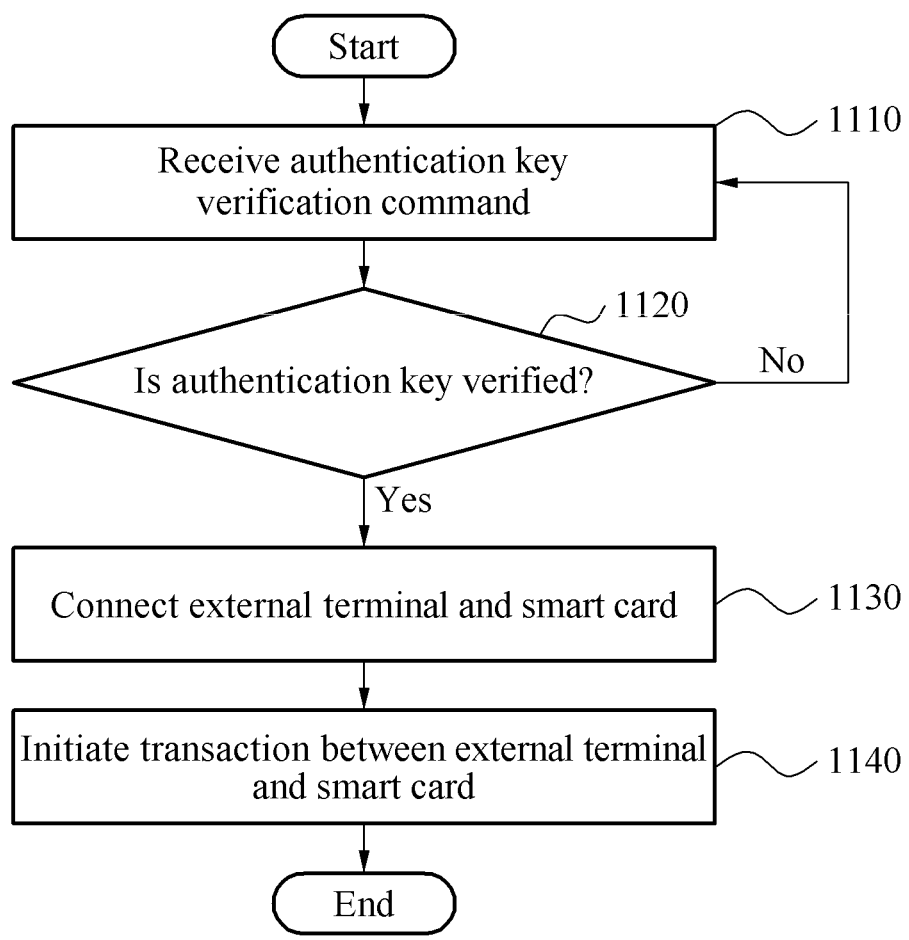
FIG. 11 is a flowchart illustrating a process of verifying an authentication key according to an embodiment.

FIG. 11 is a flowchart illustrating a process of verifying an authentication key according to an embodiment.

FIG. 11 is a flowchart illustrating a process of verifying an authentication key for user authentication for a smart card.

In operation 1110, an authentication key verification command is received from an external terminal for user authentication prior to a financial transaction performed using a smart card. When the user authentication fails through the authentication key for the financial transaction, the external terminal may not access a smart card chip and a third party that is not the user of the smart card may not use the smart card although the third party acquires the smart card.

In operation 1120, the authentication key is verified based on whether a key value received from the external terminal corresponds to the set authentication key. When the key value received from the external terminal does not correspond to the set authentication key, the authentication key verification command may be received again for re-verification. In such a case, when the verification of the authentication fails a preset number of times or more, connection between the external terminal and the smart card chip may be permanently cancelled.

In operation 1130, when the key value received from the external terminal corresponds to the set authentication key, the external terminal and the smart card chip are connected. As described with reference to FIG. 2, a portion that connects the external terminal and the smart card chip may be configured as a separate chip to connect the external terminal and the smart card chip when the authentication key is verified. As illustrated in FIG. 3, since the external terminal and the smart card chip are connected, the connection between the external terminal and the smart card chip may be cancelled when the verification of the authentication key fails.

In operation 1140, when the authentication key is verified and the external terminal and the smart card chip are connected, the financial transaction is initiated. When the authentication key is verified, the user of the smart card may be authenticated, and thus the financial transaction may be initiated.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An integrated circuit (IC) chip, comprising:
an authenticator configured to authenticate an authentication key;
an authentication key setter configured to set the authentication key when the authenticator is activated; and
a state storage configured to store an authentication key setting state in a predetermined first field in an idle field,
wherein the authenticator is configured to be activated by a command received from an external terminal and cancel connection between the external terminal and a smart card chip,
wherein when a key value received from the external terminal corresponds to the authentication key, the authenticator is configured to connect the external terminal and the smart card chip, and
wherein financial transaction is performed through the connection between the external terminal and the smart card chip.

2. The IC chip of claim 1, wherein the idle field is at least a portion of an answer to reset (ATR) data idle field.

3. The IC chip of claim 1, wherein the authentication key is a personal identification number (PIN) to be extracted from a PIN provider in the IC chip used for user authentication or a password including the key value to be injected from an external source.

4. The IC chip of claim 3, wherein the state storage is configured to store a first value in the first field when the authentication key is the PIN, and store a second value in the first field when the authentication key is the password.

5. The IC chip of claim 3, wherein, when the authentication key is the PIN and the key value received from the external terminal corresponds to the extracted PIN, the authentication key setter is configured to set the extracted PIN as the authentication key.

6. The IC chip of claim 3, wherein the PIN provider includes a physically unclonable function (PUF) configured to provide the PIN using a semiconductor manufacturing process variation.

7. The IC chip of claim 3, wherein, when the authentication key is the password, the authentication key setter is configured to reset the authentication key by an authentication key reset command of the external terminal.

8. The IC chip of claim 1, wherein the command activating the authenticator is stored in a predetermined second field in an idle field of a protocol parameter selection (PPS) command received from the external terminal.

9. The IC chip of claim 1, wherein, when the authenticator is activated, the state storage is configured to store a third value in the first field.

10. A method of setting an authentication key of an integrated circuit (IC) chip, the method comprising:
activating an authenticator by a protocol parameter selection (PPS) command to be received from an external terminal;
cancelling, by the authenticator, connection between the external terminal and a smart card chip;
setting, as an authentication key, any one of a personal identification number (PIN) and a password to be selected by a user for user authentication; and storing an authentication key setting state in a predetermined first field in an answer to reset (ATR) data idle field, wherein when a key value received from the external terminal corresponds to the authentication key, a connection between the external terminal and the smart card chip is established, and wherein financial transaction is performed through the connection between the external terminal and the smart card chip.

11. The method of claim 10, wherein the storing includes storing a first value in the first field when the authentication key is the PIN, and storing a second value in the first field when the authentication key is the password.

12. An integrated circuit (IC) chip performing a financial function, the IC chip comprising:
- an authenticator configured to authenticate an authentication key;
- an authentication key setter configured to set the authentication key when the authenticator is activated; and
- a control signal unit configured to transmit, to the authenticator, an authentication key control signal indicating an authentication key setting state,
- wherein when the authenticator receives, from the control signal unit, the authentication key control signal indicating a state in which the authentication key is not set, the authenticator is configured to cut connection to an external terminal in response to a command excluding an authentication key setting command from the external terminal.

13. The IC chip of claim 12, wherein the control signal unit is configured to transmit, to the authentication key setter, an authenticator control signal indicating whether the authenticator is activated.

14. The IC chip of claim 12, wherein the authenticator is configured to transmit, to the control signal unit, an authentication control signal indicating whether a key value received from the external terminal corresponds to the set authentication key.

15. The IC chip of claim 14, wherein the authentication key is a personal identification number (PIN) to be extracted from a PIN provider in the IC chip to be used for user authentication or a password including the key value to be injected from an external source.

16. The IC chip of claim 15, wherein, when the authenticator transmits to the control signal unit the authentication control signal indicating that the key value received from the external terminal corresponds to the extracted PIN, the authentication key setter is configured to set the extracted PIN as the authentication key.

17. The IC chip of claim 15, wherein the PIN provider includes a physically unclonable function (PUF) configured to provide the PIN using a semiconductor manufacturing process variation.

18. The IC chip of claim 15, wherein, when the authentication key is the password, the authentication key setter is configured to reset the authentication key by an authentication key reset command of the external terminal.

* * * * *